W. H. THAYER.

Assignor to W. MINOT, JR.

AUTOMATIC CAN STOPPER.

No. 10,886. Reissued Nov. 29, 1887.

Witnesses

Albert E. Lyons

R. L. Roberts.

Inventor

William H. Thayer

N. PETERS, Photo-Lithographer, Washington, D. C.

UNITED STATES PATENT OFFICE.

WILLIAM H. THAYER, OF MELROSE, ASSIGNOR TO WILLIAM MINOT, JR., OF BOSTON, MASSACHUSETTS.

AUTOMATIC CAN-STOPPER.

SPECIFICATION forming part of Reissued Letters Patent No. 10,886, dated November 29, 1887.

Original No. 361,909, dated April 26, 1887. Application for reissue filed September 24, 1887. Serial No. 250,616.

*To all whom it may concern:*

Be it known that I, WILLIAM H. THAYER, a citizen of the United States, and a resident of Melrose, in the county of Middlesex and State of Massachusetts, have invented new and useful Improvements in Automatic Can-Stoppers, of which the following, taken in connection with the accompanying drawings, is a specification.

Figure 1:
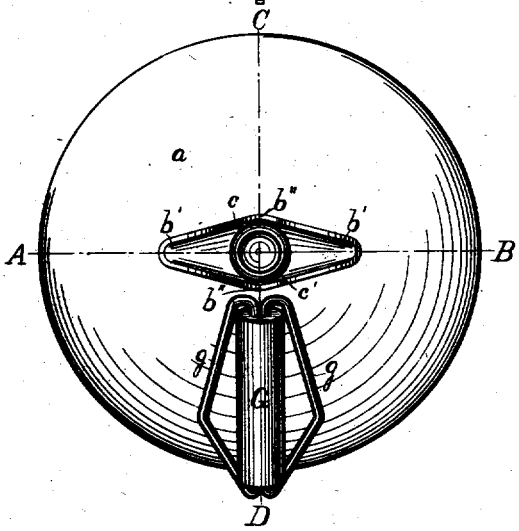
Figure 4:
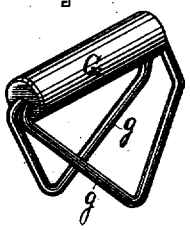
Figure 2:
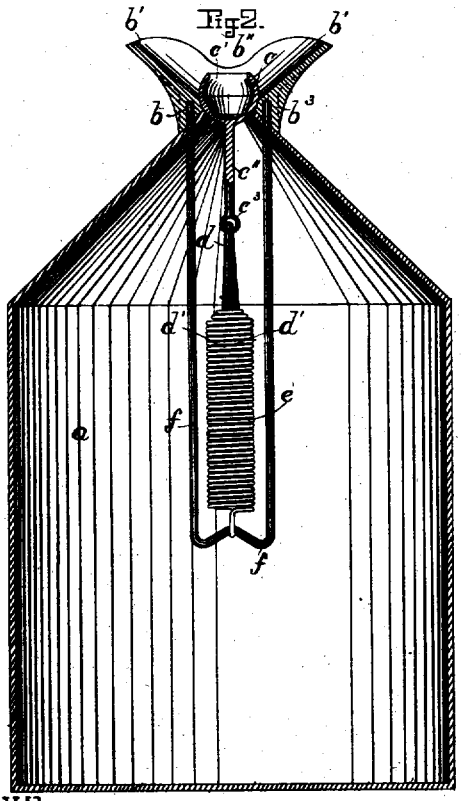
Figure 3:
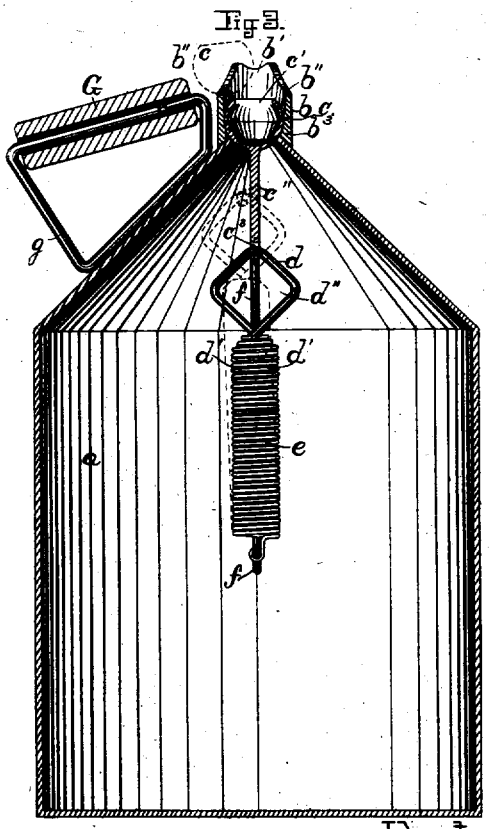

Figure 1 represents a plan view of a can provided with my improved can-stopper. Fig. 2 represents a central longitudinal section on the line A B, shown in Fig. 1; and Fig. 3 represents a longitudinal section on the line C D, also shown in Fig. 1. Fig. 4 represents a detail view of the handle detached from the can.

Similar letters refer to similar parts wherever they occur on the different parts of the drawings.

*a* is a can or liquid-receptacle, made of metal or other suitable material, to the upper end of which is secured water-tight, in a suitable manner, the neck *b*, which neck has in its upper end the two diametrically-opposite and inclined or outwardly-projecting spouts *b′ b′*, midway between which I make in the neck sides a pair of diametrically-opposite and concave recesses, *b″ b″*, either of which is adapted to serve as a rest for the spring-pressed valve when raised and held from its seat. By having a pair of diametrically-opposed spouts, *b′ b′*, the can may be tipped in either of the two opposite directions while in the act of being emptied, which is a great convenience in the manipulation of the device.

$b^3$ is the concave or tapering valve-seat in the central lower portion of the neck *b*, as shown.

*c* is the valve, which is made hollow and spheroido-conical in shape, with an opening, *c′*, in its upper portion or base of the inverted cone, through which the thumb or finger of the operator can readily be introduced when it is desired to lift the valve from its seat. From the under side of the valve *c* projects downwardly the valve-rod *c″*, having an eye, $c^3$, in its lower end, as shown in Figs. 2 and 3, and to such eye is hinged the wire *d*, having lower expansive ends or legs, *d′ d′*, to which the spiral spring *e* is suitably attached, as shown in Fig. 3, the lower end of said spring being connected to the lower end of the forked bail *f*, having its upper ends secured in suitable perforations made in the under side of the neck of the can, as shown in Fig. 2. Thus it will be seen that the spiral spring *e* serves to hold the valve *c* onto its seat $b^3$, and thus to keep the neck of the can closed at all times, except when the operator raises the valve preparatory to filling or emptying the can, and this is done by the operator inserting his thumb or one of his fingers into the hollow of the valve *c*, and raising it sufficiently to allow it to rest in one of the concave recesses *b″ b″* in the side of the neck *b*, as shown in dotted lines in Fig. 3.

The wire *d* is bent to form a stop, *d″*, which may be rectilinear or other convenient shape, and serves to prevent the spring *e* from being pulled too far when the valve is raised from its seat, the upward motion of the valve *c* being limited by said stop coming in contact with the upper internal part of the can or the lower part of the neck of the can.

By having the spring *e* attached at its lower end to the arm or bail *f* and the upper end of the latter secured to the neck *b* of the can the spring *e* will draw the valve *c* centrally at all times toward its seat, even if the can should accidentally become dented, so that the neck *b* would be out of true with the center line of the can, which object would not be attained if the lower end of the spring *e* were fastened directly to the bottom of the can itself.

The upper end of the neck *b* is made to project above the highest part of the valve, so as to protect the valve from contact with objects liable to open or injure it.

To the receptacle I secure the improved handle shown in Figs. 1 and 3, as well as in detail in Fig. 4, and it is composed of a pair of independently-bent wires, *g g*, the lower portions of which are soldered to the can-body at a proper distance apart, as shown, and having their upper ends inserted into the longitudinal perforation in the cylindrical piece G, made of wood or metal or other suitable material, as shown in said Figs. 1, 3, and 4, by which arrangement the bent wires *g g* are made to form a truss-support of great strength, so as to withstand the rough usage to which cans of this kind are oftentimes exposed.

I secure the handle to the receptacle at the side of the nozzle or spout and in a line which is radial to the valve-opening, and at right angles to a diameter thereof which will bisect the spout laterally, thus enabling the user to raise the receptacle and at the same time open the valve with one hand, and with the other to tilt it for the purpose of emptying.

This my improved automatic can stopper is especially designed for receptacles containing naphtha or other highly-inflammable liquids; but it is equally useful for those intended for such other purposes as may be found desirable.

Having thus fully described the nature, construction, and operation of my invention, I wish to secure by Letters Patent, and claim—

1. The combination, with the outlet of a liquid receptacle, a spheroido-conical valve made hollow in its top part or base, of the inverted cone, a socket or valve-seat therefor in the neck of the receptacle, and a spring attached to the smaller end of the valve or apex of the cone and to a rigid arm, *f*, projecting from the lower side of the neck into the receptacle, all substantially as described, and for the purpose specified.

2. In combination with the outlet of a liquid-receptacle having an automatically-closing valve, a double-spouted nozzle, *b′ b′*, having depressions, one upon each side thereof and diametrically opposite with relation to the valve-opening, to serve as rests for the valve when open, substantially as described.

3. In a liquid-receptacle adapted for devices for automatically closing its outlet, the combination of a spheroido-conical valve with a spring, *e*, and a stop, *d″*, attached to the stem of the valve to limit its movement and prevent the spring being drawn into the neck of the receptacle in the operation of opening, substantially as described.

4. The improved handle, as described, consisting of the bent wires *gg*, having their lower portions secured at sufficient distance apart to form a truss and having their upper ends confined within a hand-piece, G, substantially as and for the purpose set forth.

5. In combination with a liquid-receptacle having a double-spouted nozzle and a handle attached to the receptacle at the side of and midway between the spouts, an automatically-closing outlet-valve made hollow in its top part, whereby the valve can be opened and the receptacle manipulated simultaneously and with one hand, substantially as described.

WILLIAM H. THAYER.

Witnesses:
ALBERT E. LYONS,
R. L. ROBERTS.